United States Patent
Chang et al.

(10) Patent No.: US 8,823,894 B2
(45) Date of Patent: Sep. 2, 2014

(54) FRAME, BACKLIGHT MODULE AND LIQUID CRYSTAL DISPLAY MODULE AND METHOD OF FABRICATING THE FRAME THEREOF

(75) Inventors: Chih-Wei Chang, Pingtung County (TW); Po-Chun Hsu, Taipei County (TW); Kun-Hung Hsieh, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 554 days.

(21) Appl. No.: 12/970,967

(22) Filed: Dec. 17, 2010

(65) Prior Publication Data
US 2012/0092593 A1    Apr. 19, 2012

(30) Foreign Application Priority Data
Oct. 19, 2010    (TW) ................................ 99135604 A (51) Int. Cl.
*G02F 1/1333*    (2006.01)
*G02F 1/1335*    (2006.01)

(52) U.S. Cl.
CPC ............ *G02B 6/0085* (2013.01); *G02B 6/0088* (2013.01); *G02B 6/009* (2013.01)
USPC .............................................. 349/58; 349/62

(58) Field of Classification Search
USPC ................................ 349/58–67; 362/600–634
See application file for complete search history.

(56) References Cited

U.S. PATENT DOCUMENTS

| 6,466,283 | B1 | 10/2002 | Peng |
| 7,443,460 | B2 * | 10/2008 | Park ................................ 349/58 |
| 7,545,628 | B2 * | 6/2009 | Takuma ................... 361/679.26 |
| 8,132,940 | B2 * | 3/2012 | Shimojoh ................ 362/296.05 |
| 2005/0151894 | A1 * | 7/2005 | Katsuda et al. .................. 349/58 |
| 2008/0055513 | A1 * | 3/2008 | Ichio ................................ 349/58 |
| 2011/0085107 | A1 * | 4/2011 | Noh et al. ........................ 349/61 |

FOREIGN PATENT DOCUMENTS

TW    200815849    4/2008

OTHER PUBLICATIONS

"First Office Action of China Counterpart Application", issued on Aug. 31, 2011, p. 1-p. 3, in which the listed reference was cited.

* cited by examiner

*Primary Examiner* — Bumsuk Won
*Assistant Examiner* — Charles Chang
(74) *Attorney, Agent, or Firm* — Jianq Chyun IP Office (57) ABSTRACT

A frame formed by cutting and bending a plate base is provided. The maximum thickness of the frame is T, the thickness of the plate base is t, and 1.5t≤T≤2.5t. The frame includes a first plate element, a second plate element, and a bending portion. The second plate element is directly contacted to the first plate element, and the first plate element is substantially parallel to the second plate element. The bending portion is connected between the first plate element and the second plate element. A backlight module using the above-mentioned frame and a liquid crystal display (LCD) module using the backlight module are also provided.

17 Claims, 8 Drawing Sheets

FRAME, BACKLIGHT MODULE AND LIQUID CRYSTAL DISPLAY MODULE AND METHOD OF FABRICATING THE FRAME THEREOF

CROSS-REFERENCE TO RELATED APPLICATION

This application claims the priority benefit of Taiwan application serial no. 99135604, filed on Oct. 19, 2010. The entirety the above-mentioned patent application is hereby incorporated by reference herein and made a part of specification.

BACKGROUND OF THE INVENTION

1. Field of the Invention

The invention relates to a frame, a backlight module, and a liquid crystal display (LCD) module. More particularly, the invention relates to a frame, a backlight module, and an LCD module which are easy to be processed with low costs.

2. Description of Related Art

With great advance in electro-optical and semiconductor manufacturing technologies, flat panel displays have been vigorously developed. Among the flat panel displays, LCD modules characterized by low voltage operation, non-radiation, light weight, and small volume occupancy gradually replace conventional cathode ray tube (CRT) displays and become the mainstream display products.

In general, an LCD module includes a backlight module, an LCD panel, and other components. The LCD panel is configured on the backlight module, and the backlight module includes a light guide plate (LGP) and a light source that serves as a backlight source for the LCD panel to display images.

Due to the increasing demands on miniaturizing the LCD module, components in the LCD module are likely to have small dimensions but weak structural strength. Conventional edge-type backlight modules 100a and 100b are exemplified below, as shown in FIG. 1A and FIG. 1B.

Figure 1A:
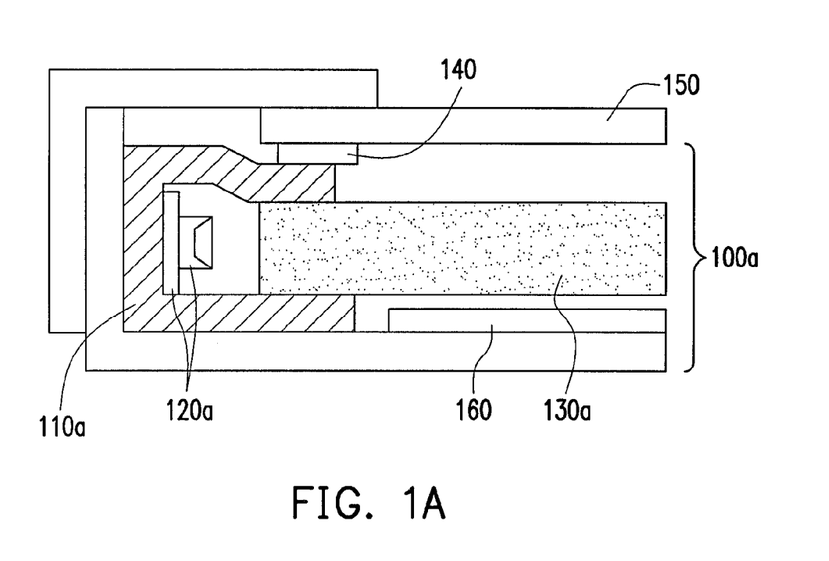
FIG. 1A and FIG. 1B are partial cross-sectional views respectively illustrating a conventional edge-type backlight module.

In the backlight module 100a depicted in FIG. 1A, a reflective frame 110a usually has a relatively great height in order to accommodate a light emitting diode (LED) light bar 120a, a reflector 160, and a light-incident side of an LGP 130a and carry a cushion pad 140 and an LCD panel 150. As such, the entire thickness of the backlight module 100a cannot be easily reduced, which gives rise to difficulties in miniaturization.

Figure 1B:
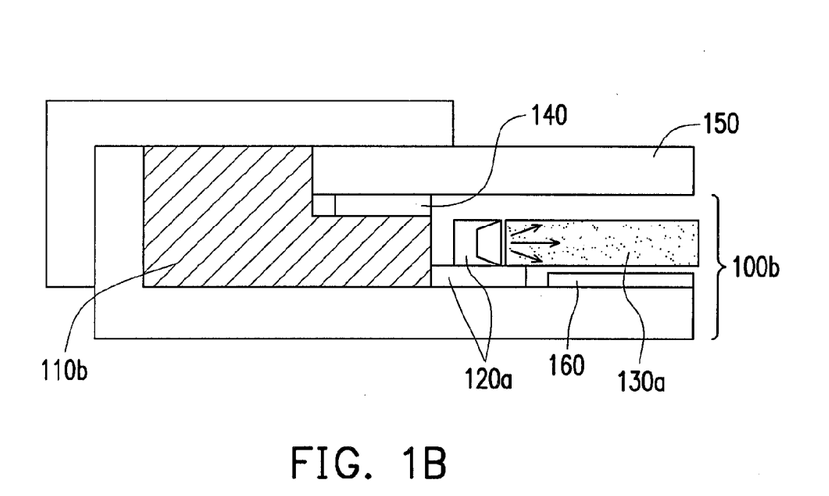

In the edge-type backlight module 100b depicted in FIG. 1B, an aluminum extruded heat sink 110b carries the cushion pad 140 and the LCD panel 150, so as to comply with the requirement for sufficient structural strength, satisfactory heat dissipation, and miniaturization. However, if components for assembly and alignment (e.g., alignment notches, through holes, and so on) are to be formed, additional processing costs are required.

SUMMARY OF THE INVENTION

The invention is directed to a frame that is characterized by both miniaturization and favorable mechanical strength and can be easily processed with low processing costs.

The invention is further directed to a backlight module in which the aforesaid frame is employed, and therefore the backlight module also has the advantages listed above.

The invention is further directed to an LCD module in which the aforesaid backlight module is employed, and therefore the LCD module also has the advantages listed above.

The invention provides a frame that is formed by cutting and bending a plate base. The maximum thickness of the frame is T, the thickness of the plate base is t, and $1.5t \le T \le 2.5t$. The frame includes a first plate element, a second plate element, and a bending portion. The second plate element is directly contacted to the first plate element, and the first plate element is substantially parallel to the second plate element. The bending portion is connected between the first plate element and the second plate element.

According to an embodiment of the invention, a material of the plate base includes a metallic material or an alloy.

According to an embodiment of the invention, a Young's modulus of the plate base is substantially greater than or equal to $10^4$ MPa.

According to an embodiment of the invention, $0.3 \text{ mm} \le t \le 5.0 \text{ mm}$.

According to an embodiment of the invention, $0.45 \text{ mm} \le T \le 12.5 \text{ mm}$.

The invention further provides a backlight module that includes a back plate, the aforesaid frame, an LGP, and a light bar. The first plate element is directly contacted to the back plate and located between the second plate element and the back plate. The LGP is configured on the back plate and has a light-incident side surface. The light bar is configured on the back plate and located between the first plate element and the light-incident side surface of the LGP.

According to an embodiment of the invention, the first plate element has a first alignment notch. The LGP has a first alignment portion fixed into the first alignment notch.

According to an embodiment of the invention, the light bar includes a circuit board and a plurality of LED devices. The circuit board has a second alignment portion fixed into the first alignment notch. The LED devices are configured on the circuit board.

According to an embodiment of the invention, the backlight module further includes an optical film set configured above the LGP. According to an embodiment of the invention, the second plate element has a second alignment notch. According to an embodiment of the invention, the optical film set has a third alignment portion fixed into the second alignment notch.

According to an embodiment of the invention, the first plate element has a first through hole, and the second plate element has a second through hole corresponding to the first through hole. According to an embodiment of the invention, the back plate has a locking hole corresponding to the first through hole and the second through hole. According to an embodiment of the invention, the backlight module further includes a locking element that penetrates the first through hole and the second through hole and is locked into the locking hole.

According to an embodiment of the invention, the backlight module further includes a reflector configured below the LGP.

The invention further provides an LCD module that includes the aforesaid backlight module, an LCD panel, and a front bezel. The LCD panel is configured on the frame and located above the LGP. The front bezel is assembled to the back plate to cover the frame and a portion of the LCD panel.

Based on the above, a cutting process can be performed on the plate base of the frame according to the embodiments of the invention, such that the frame can have predetermined openings which later form the first through hole, the second through hole, the first alignment notch, or the second alignment notch. After the plate base is bent at an angle of 180 degrees along a bending line, the frame having the first through hole, the second through hole, the first alignment notch, or the second alignment notch can be directly formed. In comparison with the conventional aluminum extruded frame, the frame of this invention can be easily processed with low processing costs.

On the other hand, compared to the conventional reflective frame and the conventional heat sink, the frame of the invention has a miniaturized structure and is easy to be formed with low costs. Besides, the backlight module and the LCD panel using said frame also have the aforesaid advantages.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 2:
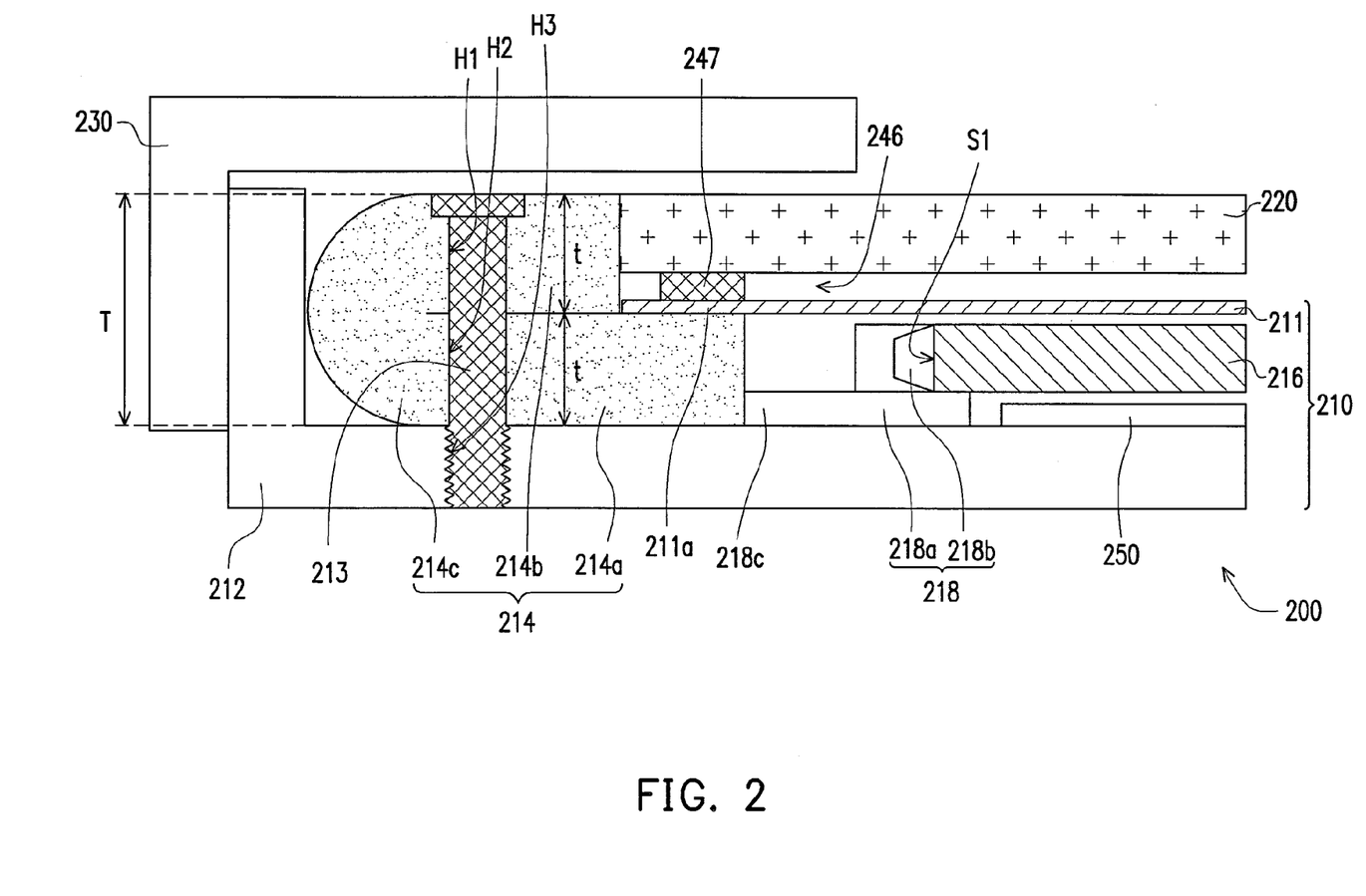
FIG. 2 is a cross-sectional view illustrating a portion of an LCD panel according to an embodiment of the invention.
Figure 2A:
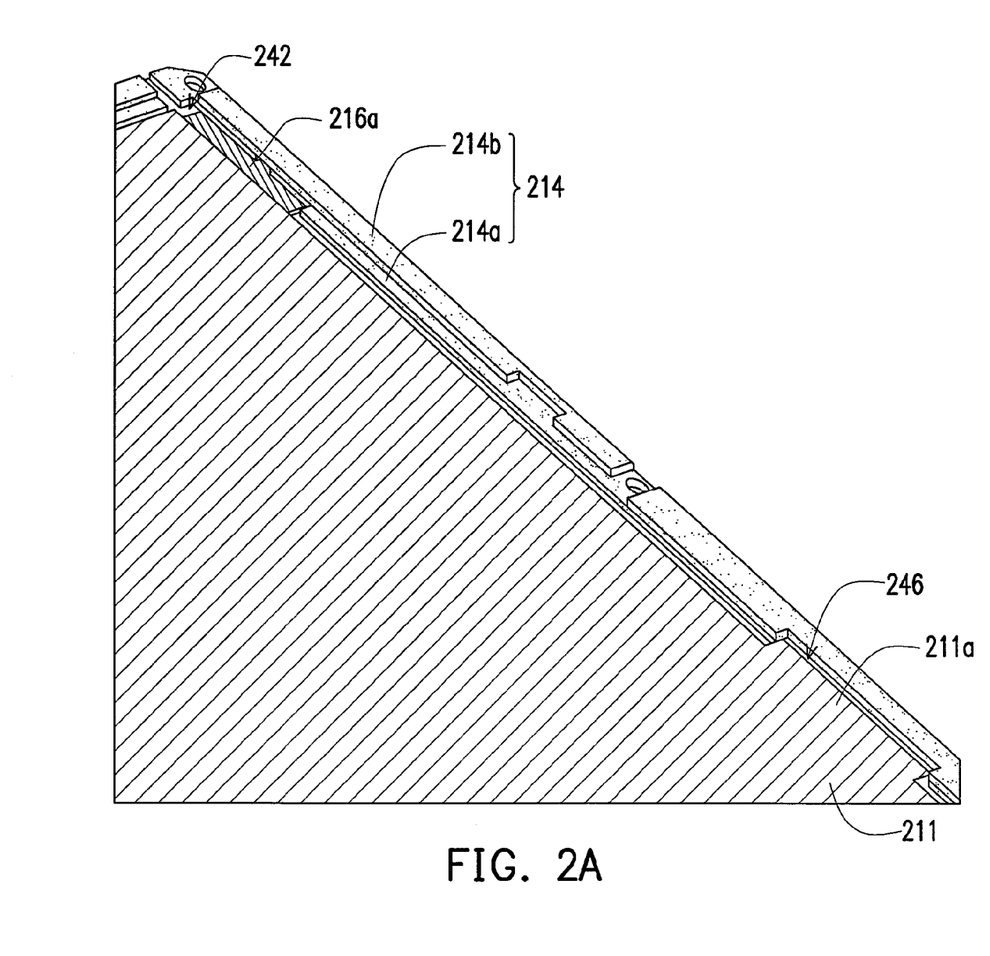
FIG. 2A to FIG. 2C are schematic three-dimensional partial views illustrating that an LGP and an optical film set in FIG. 2 are assembled to a frame.
Figure 2B:
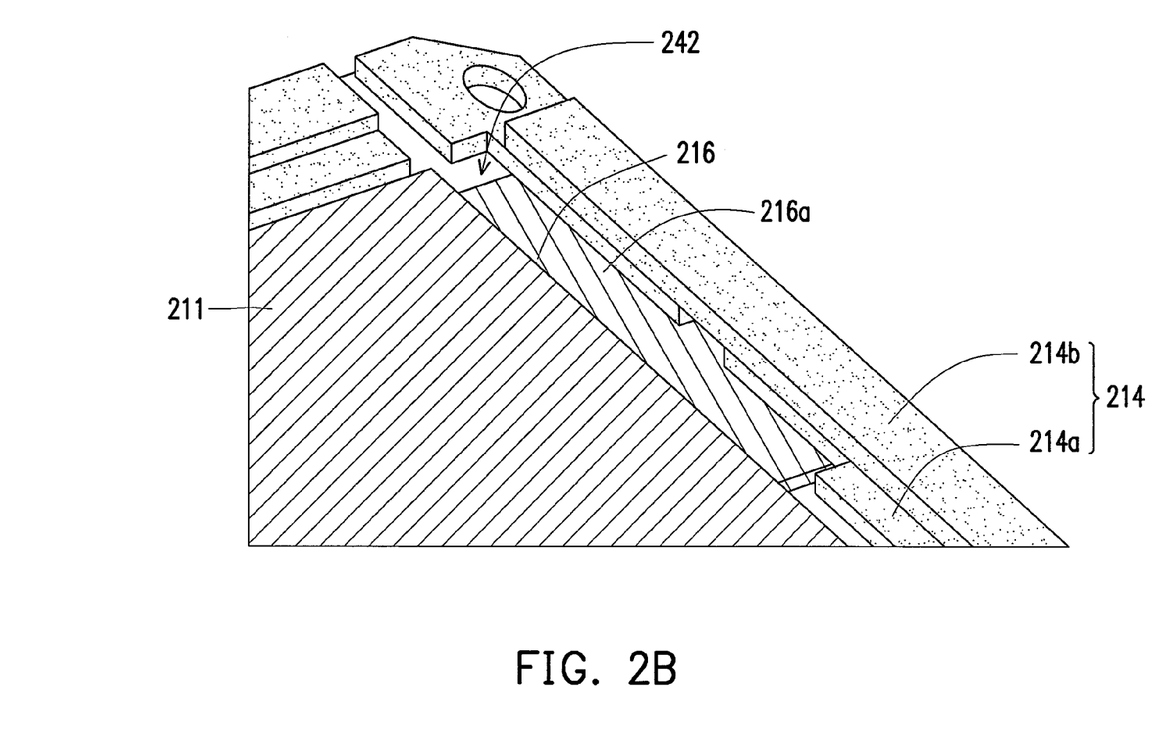
Figure 2C:
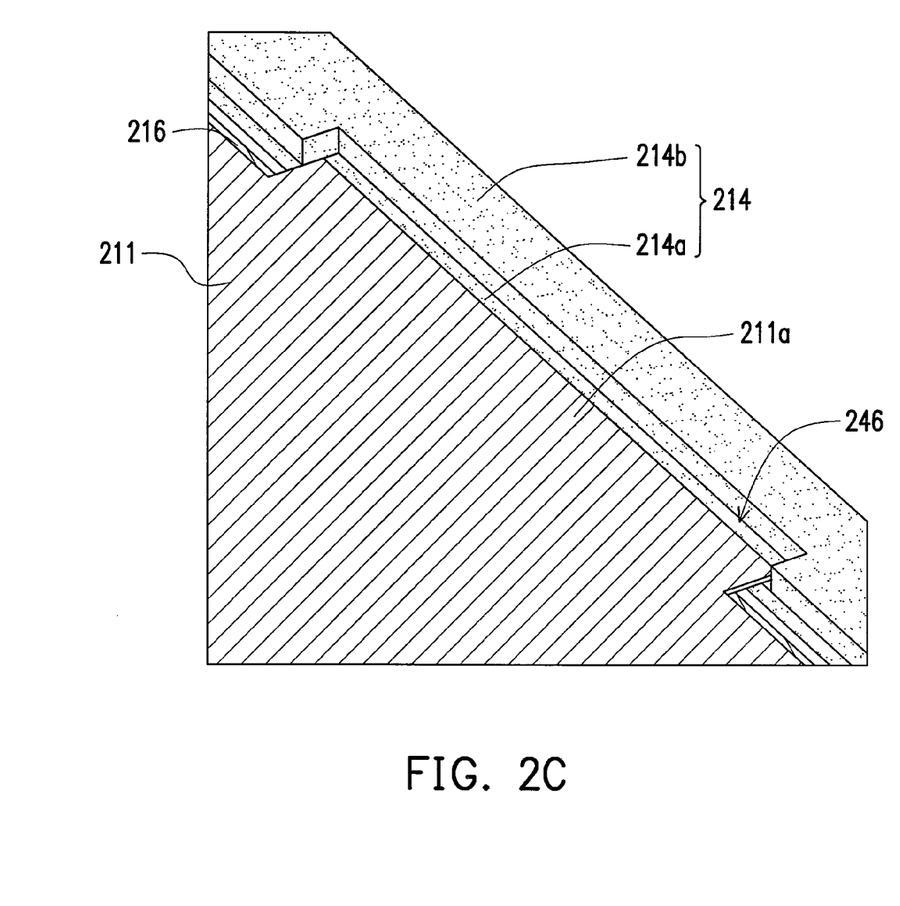
Figure 3A:
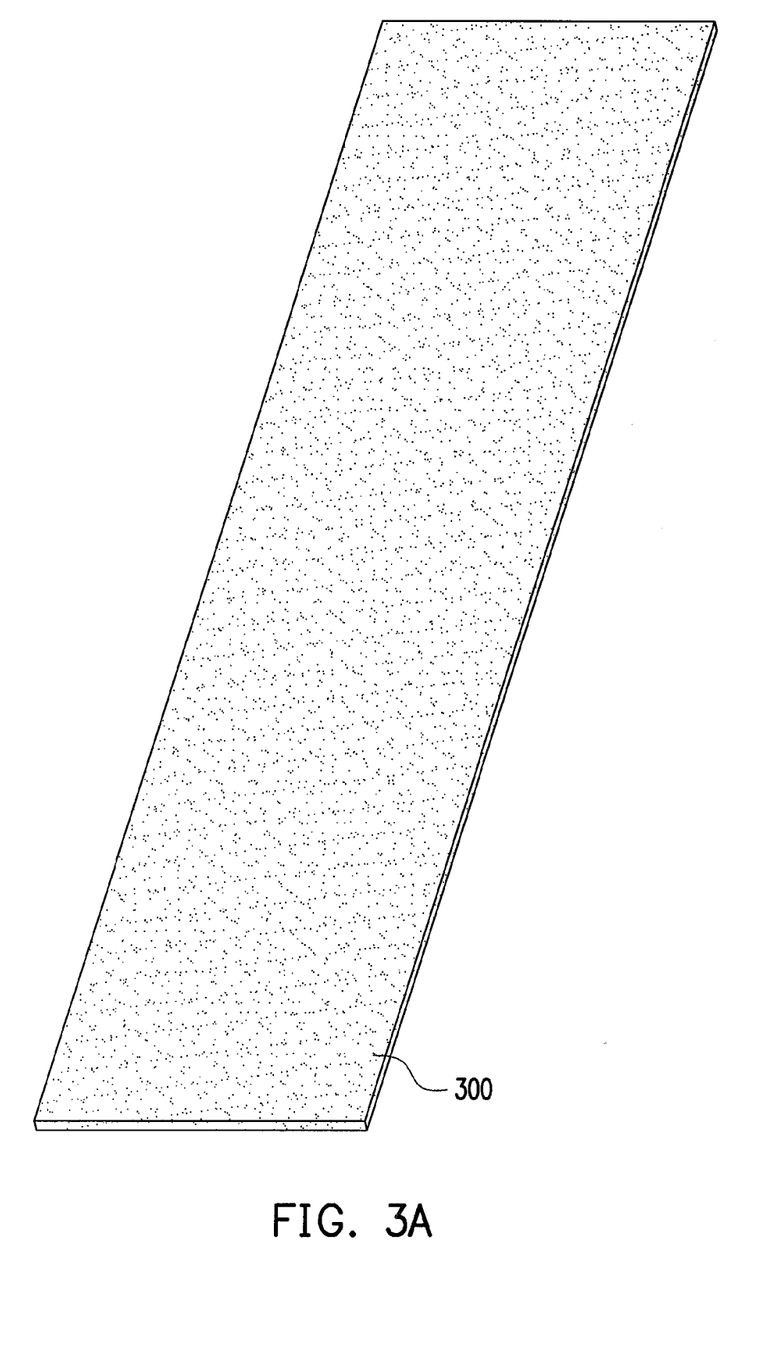
FIG. 3A to FIG. 3C are schematically views illustrating steps of forming the frame depicted in FIG. 2.
Figure 3B:
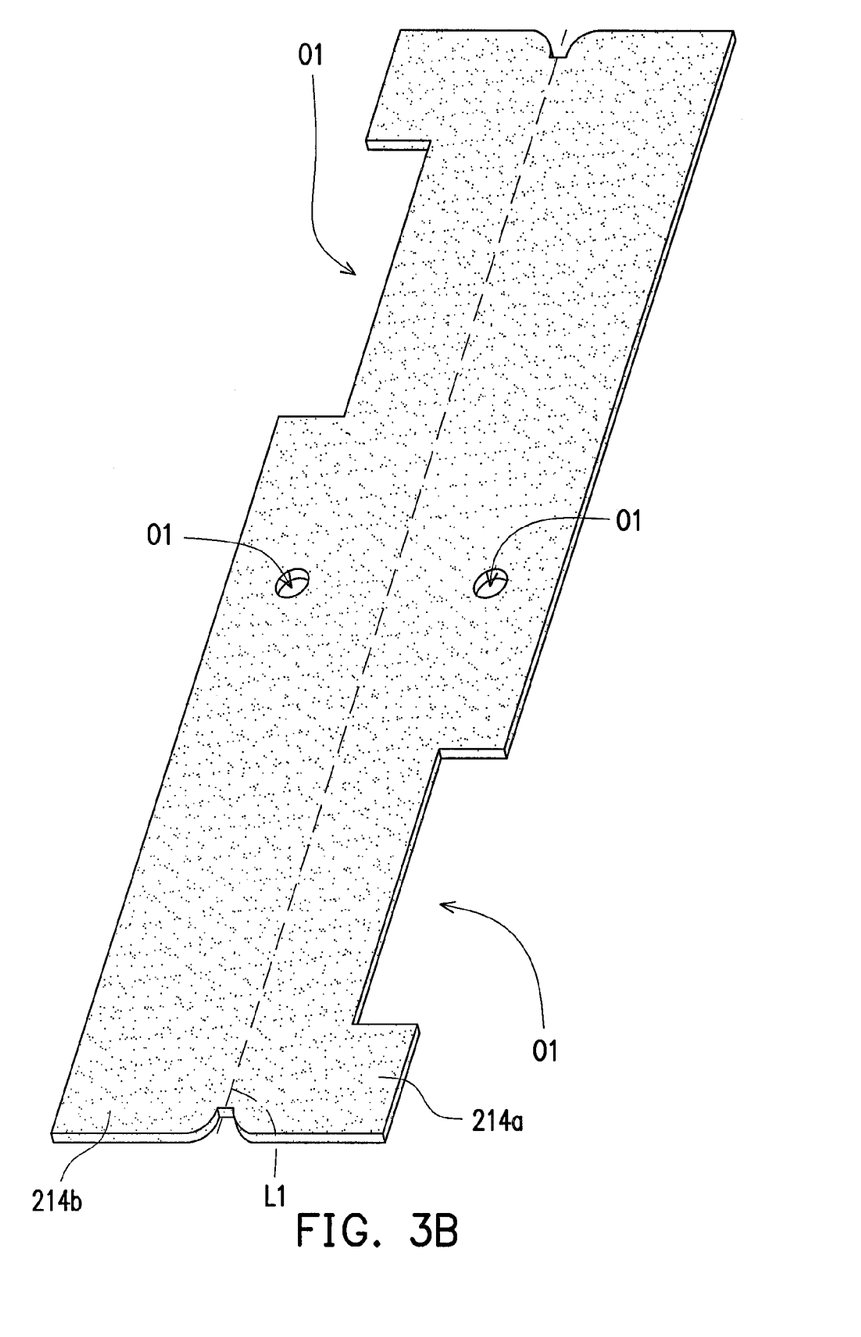
Figure 3C:
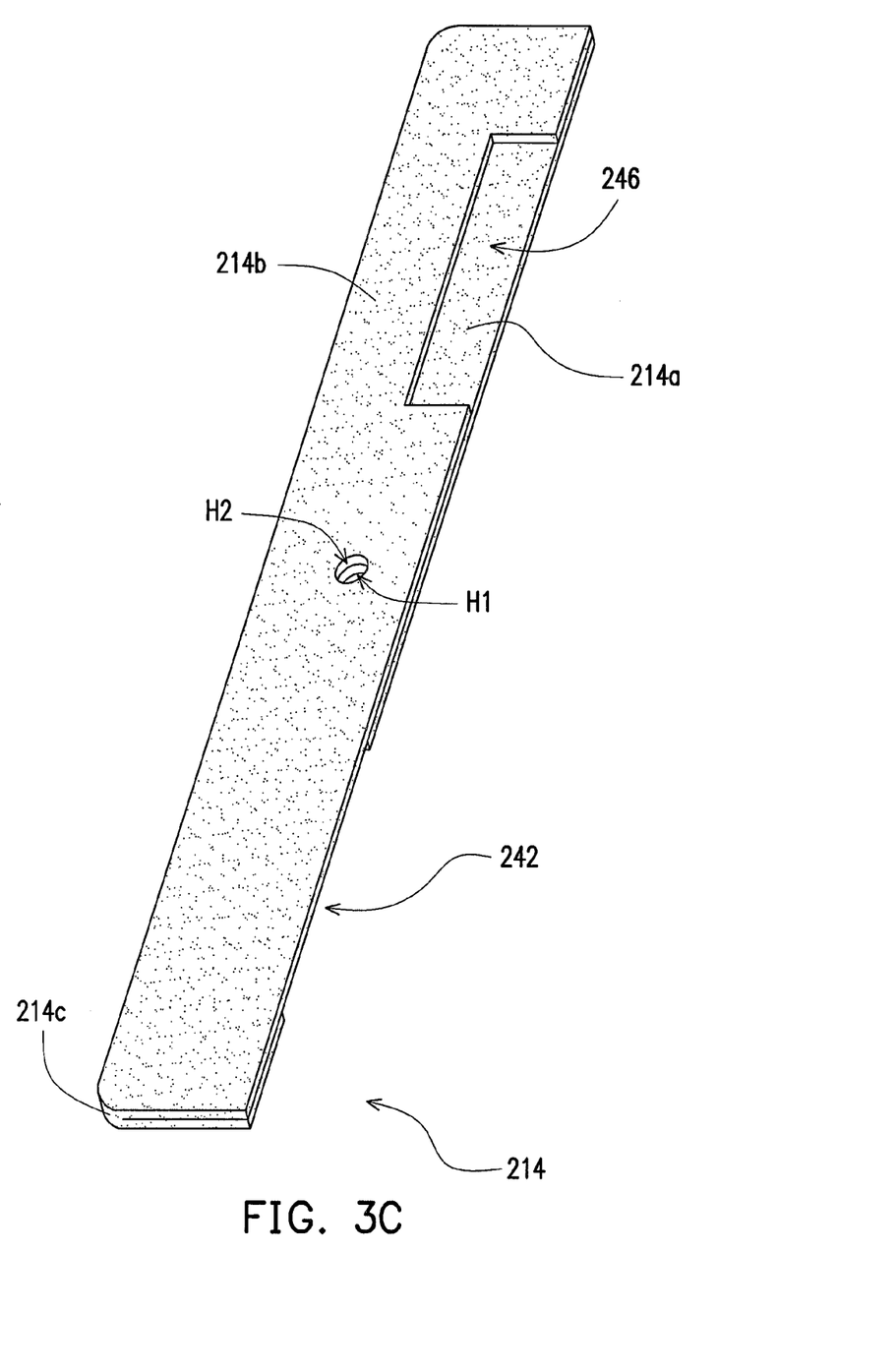

FIG. 2 is a cross-sectional view illustrating a portion of an LCD panel according to an embodiment of the invention. FIG. 2A to FIG. 2C are schematic three-dimensional partial views illustrating that an LGP and an optical film set in FIG. 2 are assembled to a frame. FIG. 3A to FIG. 3C are schematically views illustrating steps of forming the frame depicted in FIG. 2. With reference to FIG. 2, an LCD module 200 of this embodiment includes a backlight module 210, an LCD panel 220, and a front bezel 230. The backlight module 210 includes a back plate 212, a frame 214, a reflector 250, an LGP 216, and a light bar 218. In this embodiment, the frame 214 includes a first plate element 214a, a second plate element 214b, and a bending portion 214c. The second plate element 214b is directly contacted to the first plate element 214a, and the first plate element 214a is substantially parallel to the second plate element 214b. The bending portion 214c is connected between the first plate element 214a and the second plate element 214b, as shown in FIG. 2.

With reference to FIG. 2 and FIG. 3C, in this embodiment, the first plate element 214a has a first alignment notch 242, and the LGP 216 has a first alignment portion 216a. The first alignment portion 216a of the LGP 216 is fixed into the first alignment notch 242. That is to say, the first alignment notch 242 can be engaged with the first alignment portion 216a, such that the LGP 216 is fixed and aligned by the first plate element 214a. Specifically, the first alignment notch 242 of the first plate element 214a is engaged with the first alignment portion 216a of the LGP 216 in the way shown in FIG. 2A and FIG. 2B. Note that FIG. 2B is a three-dimensional, partially enlarged view of FIG. 2A. The entire thickness of the LGP 216 in this embodiment substantially ranges from about 0.4 mm to about 2.0 mm. In this embodiment, the light bar 218 is bonded or adhered to the LGP 216, and the first alignment portion 216a is inserted and fixed into the first alignment notch 242. The light bar 218 is, as a matter of fact, not inserted and fixed into the first alignment notch 242, as shown in FIG. 2A and FIG. 2B.

However, in other embodiments, the light bar 218 of the backlight module 210 includes a circuit board 218a and a plurality of LED devices 218b. Here, the circuit board 218a can also have a second alignment portion (not shown) which is fixed into the first alignment notch 242. That is to say, the first alignment portion 216a and the second alignment portion are together engaged with the first alignment notch 242, and thereby the circuit board 218a is fixed and aligned by the first plate element 214a.

Besides, the LED devices 218b are configured on and electrically connected to the circuit board 218a. Here, the circuit board 218a can be a normal printed circuit board or a flexible circuit board. In this embodiment, the thickness of the circuit board 218a substantially ranges from about 0.1 mm to about 1.0 mm, the height (thickness) of the LED devices 218b substantially ranges from about 0.4 mm to about 2.0 mm, and the entire height (thickness) of the light bar 218 substantially ranges from about 0.5 mm to about 3.0 mm.

With reference to FIG. 2, the second plate element 214b of the frame 214 has a second alignment notch 246. When the backlight module 210 further includes an optical film set 211 that has one or more than one film, the optical film set 211 can be located above the reflector 250 and the LGP 216. The optical film set 211 has a third alignment portion 211a fixed into the second alignment notch 246. That is to say, the third alignment portion 211a is engaged with the second alignment notch 246, and thereby the optical film set 211 is fixed and aligned by the second plate element 214b. Specifically, the third alignment portion 211a is engaged with the second alignment notch 246 in the way shown in FIG. 2A and FIG. 2C, for instance. Note that FIG. 2C is a three-dimensional, partially enlarged view of FIG. 2A. It can be learned from FIG. 2A to FIG. 2C that the optical film set 211 is located above the LGP 216, and the LGP 216 and the optical film set 211 are respectively engaged with the first alignment notch 242 and the second alignment notch 246 and are fixed onto the frame 214.

The LCD panel 200 of this embodiment further includes a cushion pad 247 configured on the frame 214. The thickness of the cushion pad 247 is greater than the thickness of the optical film set 211. The cushion pad 247 is mainly applied to prevent the LCD panel 220 from being damaged by direct contact with the optical film set 211 or the frame 214. On the other hand, in the frame 214, the first plate element 214a has a first through hole H1, and the second plate element 214b has a second through hole H2 corresponding to the first through hole H1, as shown in FIG. 2. That is to say, the second through hole H2 and the first through hole H1 can be communicated with each other in this embodiment.

The frame 214 of this embodiment is formed by bending a cut plate base 300, and detailed steps of forming the frame 214 are described hereinafter.

According to the method of forming the frame 214 described in this embodiment, a plate base 300 as shown in FIG. 3A is provided, and a thickness of the plate base 300 is defined as t, for instance. Please also refer to FIG. 2 for illustration. The first plate element 214a and the second plate element 214b are defined at the left side and the right side of a bending line L1 of the plate base 300, and a cutting process is performed on the plate base 300, such that the plate base 300 has a plurality of predetermined openings O1, as shown in FIG. 3B. In an embodiment, the cutting process can be performed to form two notches at two ends of the bending line L1, and a rounding portion can be formed spontaneously so as to prevent injury. If the cutting process is not performed to form the two notches, an additional cutting process still needs to be implemented after the bending process is performed to form a rounding portion. Hence, when the predetermined openings O1 are formed by implementing the cutting process, the same cutting process can be performed to simultaneously form the notches, so as to omit the step of subsequently forming the rounding portion. Namely, only one cutting process is required.

The plate base 300 is bent along the bending line L1 of the plate base 300, so as to form the bending portion 214c shown in FIG. 2 and FIG. 3C. The plate base 300 is bent at the angle of 180 degrees, and thereby the second plate element 214b can be directly contacted to and parallel to the first plate element 214a. So far, the frame 214 shown in FIG. 2 and FIG. 3C can be formed. Here, the frame 214 formed by bending the plate base 300 has the maximum thickness T. Practically, if a mold is used to bend the plate base 300, the thickness of the plate base 300 can be reduced, such that the maximum thickness T of the frame 214 is smaller than 2t. After the plate base 300 is completely bent, the second plate element 214b and the first plate element 214a are not necessarily attached to each other. That is to say, the maximum thickness T of the frame 214 can be greater than 2t. Hence, in order to comply with the actual requirement, the maximum thickness T is restricted to be within the range of 1.5t~2.5t. In this embodiment, 0.3 mm≤t≤5.0 mm, and 0.45 mm≤T≤12.5 mm.

The plate base 300 of this embodiment has a plurality of predetermined openings O1. Therefore, after the plate base 300 is bent at an angle of 180 degrees, some of the openings O1 that are symmetric to each other with respect to the bending line L1 face to each other. As such, the symmetric openings O1 corresponding to each other can form the first through hole H1 and the second through hole H2 after the plate base 300 is bent. By contrast, the other openings O1 that are not symmetric to each other with respect to the bending line L1 become the first alignment notch 242 and the second alignment notch 246 after the plate base 300 is formed, which is described hereinafter.

After the second plate element 214b is bent onto the first plate element 214a, the opening O1 located on the second plate element 214b exposes the first plate element 214a, so as to define the second alignment notch 246 of the second plate element 214b. On the contrary, the opening O1 located on the first plate element 214 exposes the second plate element 214b, so as to define the first alignment notch 242 of the first plate element 214a.

In other words, the positions of the first through hole H1, the second through hole H2, the first alignment notch 242, and the second alignment notch 246 can be predetermined before the plate base 300 is bent, and then the cutting process is performed on the plate base 300. As such, the predetermined openings O1 which later form the first through hole H1, the second through hole H2, the first alignment notch 242, and the second alignment notch 246 can be made on the plate base 300. Under said design, the frame 214 having the first through hole H1, the second through hole H2, the first alignment notch 242, and the second alignment notch 246 can be directly formed after the plate base 300 is bent at the angle of 180 degrees. Normally, if the structure (i.e., the first through hole H1, the second through hole H2, the first alignment notch 242, and the second alignment notch 246) of the frame 214 of this embodiment is formed in the conventional way to form the aluminum extruded frame, several processing steps are required, and the processing costs cannot be lowered down. Namely, in comparison with the conventional aluminum extruded frame, the frame 214 of this embodiment not only has a miniaturized structure but also can be easily processed with low processing costs.

The plate base 300 can be made of a metallic material or an alloy, such as a zinc-plated steel plate, an aluminum-zinc-plated steel plate, a stainless steel plate, an aluminum plate, and so on. In other words, even though the frame 214 of this embodiment has the miniaturized structure, the frame 214 can still have favorable strength. In practice, the plate base 300 is preferably made of a material with the Young's modulus equal to or greater than $10^4$ MPa, such as the steel plate of which the Young's modulus is about $2 \times 10^5$ MPa, the aluminum plate of which the Young's modulus is about $7 \times 10^4$ MPa, or other metallic materials/alloys.

With reference to FIG. 2, in the backlight module 210, the first plate element 214a of the frame 214 is directly contacted with the back plate 212, and the first plate element 214a is located between the second plate element 214b and the back plate 212. Besides, the LGP 216 is configured on the back plate 212 and has a light-incident side surface S1. The light bar 218 is configured on the back plate 212 and located between the first plate element 214a and the light-incident side surface S1 of the LGP 216, as shown in FIG. 2.

The backlight module 210 of this embodiment is an edge-type backlight module, for instance. The frame 214 located in the backlight module 210 has the alignment structure in which the first through hole H1, the second through hole H2, the first alignment notch 242, and the second alignment notch 246 are formed after the plate base 300 is bent. Accordingly, the backlight module 210 as a whole can have the relatively miniaturized structure. Since the backlight module 210 has the frame 214, the backlight module 210 also has said advantages of the frame 214. Further descriptions in this regard are thus omitted.

In the LCD module 200, the LCD panel 220 is configured on the frame 214 of the backlight module 210 and located above the LGP 216. The front bezel 230 is assembled to the back plate 212 to cover the frame 214 and a portion of the LCD panel 220, as shown in FIG. 2. The back plate 212 of the backlight module 210 in this embodiment has a locking hole H3 corresponding to the first through hole H1 and the second through hole H2. The backlight module 210 can further include a locking element 213 penetrating the first through hole H1 and the second through hole H2, and the locking element 213 is locked into the locking hole H3, as shown in FIG. 2. The locking element 213 of this embodiment is a screw, and the locking hole H3 is a threaded hole, for instance. In this embodiment, the screw serving as the locking element 213 is embedded into the first through hole H1 of the second plate element 214b. Alternatively, the second plate element 214b can have an evasion design, such that the screw serving as the locking element 213 is merely locked into the second through hole H2 and the locking hole H3. The head of the screw serving as the locking element 213 is not exposed in most cases and is not contacted with the front bezel 230, so as to prevent unnecessary friction and damages. The front bezel 230 can also be locked together by the locking element 213 in an alternative embodiment.

Since the LCD module 200 has the aforesaid backlight module 210 and its frame 214, the LCD module 200 as a whole not only has the miniaturized structure but also has the advantages of the backlight module 210 and its frame 214. Further descriptions in this regard are thus omitted hereinafter.

In light of the foregoing, the frame, the backlight module, and the LCD module of this invention at least have following advantages. First, a cutting process can be performed on the plate base, such that the frame has the predetermined openings (e.g., the first through hole, the second through hole, the first alignment notch, or the second alignment notch). After the plate base is bent at an angle of 180 degrees along a bending line, the frame having the first through hole, the second through hole, the first alignment notch, and the second alignment notch can be directly formed. In comparison with the conventional aluminum extruded frame, the frame of this invention can be easily processed with low processing costs.

On the other hand, compared to the conventional reflective frame and the conventional heat sink, the frame of the invention has a miniaturized structure and is easy to be formed with low costs. Besides, the backlight module and the LCD panel using said frame also have the aforesaid advantages.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims not by the above detailed descriptions. In addition, any embodiment or claim of the invention does not need to attain all of the advantages or features disclosed in the invention. The abstract and title are merely used for facilitating the search for patent documents, and the scope of the invention is not limited thereto.

What is claimed is:

1. A frame formed by cutting and bending a plate base, a maximum thickness of the frame being T, a thickness of the plate base being t, $1.5t \leq T \leq 2.5t$, the frame comprising:
    a first plate element having a first alignment notch;
    a second plate element having a second alignment notch and directly contacted to and overlapped with the first plate element, the first plate element being substantially parallel and attached to the second plate element with the first alignment notch exposing a portion of the second plate element while the second alignment notch exposing a portion of the first plate element, wherein the first alignment notch and the second alignment notch are mutually misaligned; and
    a bending portion connected between the first plate element and the second plate element.

2. The frame as claimed in claim 1, wherein a material of the plate base comprises a metallic material or an alloy.

3. The frame as claimed in claim 1, wherein a Young's modulus of the plate base is substantially greater than or equal to $10^4$ MPa.

4. The frame as claimed in claim 1, wherein $0.3 \text{ mm} \leq t \leq 5.0 \text{ mm}$.

5. The frame as claimed in claim 1, wherein $0.45 \text{ mm} \leq T \leq 12.5 \text{ mm}$.

6. The frame as claimed in claim 1, wherein the first plate element has a first through hole, and the second plate element has a second through hole corresponding to the first through hole.

7. A backlight module comprising:
    a back plate;
    at least one frame as claimed in claim 1 disposed on the back plate, and the first plate element being directly contacted to the back plate and located between the second plate element and the back plate;
    a light guide plate configured on the back plate and having a light-incident side surface and a first alignment portion fixed into the first alignment notch;
    an optical film set configured above the light guide plate and having a third alignment portion fixed into the second alignment notch; and
    a light bar configured on the back plate and located between the first plate element and the light-incident side surface of the light guide plate.

8. The backlight module as claimed in claim 7, the light bar comprising:
    a circuit board having a second alignment portion fixed into the first alignment notch; and
    a plurality of light emitting diode devices configured on the circuit board.

9. The backlight module as claimed in claim 7, wherein the first plate element has a first through hole, and the second plate element has a second through hole corresponding to the first through hole.

10. The backlight module as claimed in claim 9, wherein the back plate has a locking hole corresponding to the first through hole and the second through hole.

11. The backlight module as claimed in claim 10, further comprising a locking element penetrating the first through hole and the second through hole and being locked into the locking hole.

12. The backlight module as claimed in claim 7, further comprising a reflector configured below the light guide plate.

13. A liquid crystal display module comprising:
    the backlight module as claimed in claim 7;
    a liquid crystal display panel configured on the frame and located above the light guide plate; and
    a front bezel assembled to the back plate to cover the frame and a portion of the liquid crystal display panel.

14. A method of fabricating a frame, comprising:
    providing a plate base comprising a first portion element and a second portion element at opposite sides defined by a bending line;
    cutting the first portion element to form a plurality of predetermined openings, wherein portions of the openings are symmetrical to each other along the bending line while the others are not;
    bending a plate base along the bending line, and the openings not symmetrical to each other along to the bending line are located at a same side of the bending line and form a first alignment notch mutually misaligned with a second alignment notch with the first alignment notch exposing a portion of the second plate element and the second alignment notch exposing a portion of the first plate element.

15. The method as claimed in claim 14, after bending the plate base, a bending portion connected between the first plate element and the second plate element is further formed.

16. The method as claimed in claim 14, after bending the plate base, the openings symmetrical to each other along the bending line are further overlapped with each other to form through holes.

17. The method as claimed in claim 14, wherein a material of the plate base comprises a metallic material or an alloy.

* * * * *